| United States Patent [19] | [11] | Patent Number: | 4,908,396 |
|---|---|---|---|
| Evans et al. | [45] | Date of Patent: | Mar. 13, 1990 |

[54] FILLERS

[75] Inventors: Martin B. Evans, Oulton; Roger N. Rothon, Guilden Sutton, both of England

[73] Assignee: Imperial Chemical Industries PLC, London, England

[21] Appl. No.: 196,489

[22] Filed: May 20, 1988

[30] Foreign Application Priority Data

May 22, 1987 [GB] United Kingdom ............... 8712107
Jun. 25, 1987 [GB] United Kingdom ............... 8714916

[51] Int. Cl.$^4$ ................... C08K 9/04; C08L 21/00; C08L 23/16
[52] U.S. Cl. ................... 523/202; 523/203; 523/205; 523/206
[58] Field of Search ............... 523/202, 203, 205, 206

[56] References Cited

U.S. PATENT DOCUMENTS

| 4,242,251 | 12/1980 | Aishima et al. | 523/202 |
| 4,322,336 | 3/1982 | Machurat et al. | 524/104 |
| 4,348,311 | 9/1982 | Machurat et al. | 523/212 |
| 4,418,163 | 11/1983 | Murakami et al. | 523/205 |
| 4,433,073 | 2/1984 | Sano et al. | 523/206 |
| 4,650,818 | 3/1987 | Oka et al. | 523/205 |
| 4,764,544 | 8/1988 | Carey et al. | 523/206 |

FOREIGN PATENT DOCUMENTS 0042748  3/1982  Japan ................... 523/202

OTHER PUBLICATIONS

Derwent Abs 81-84883D/46, Mednikov et al., SU-804660, 2-1981.
Derwent Abs, 78-86094A/48, BE867333 (11-78).
Derwent Abs, 88-230538/33, J63162766 (7-88).

*Primary Examiner*—Herbert J. Lilling
*Attorney, Agent, or Firm*—Cushman, Darby & Cushman

[57] ABSTRACT

A cohesive polymer matrix comprising a matrix polymer and a coated particulate filler dispersed therein, characterized in that the matrix polymer is a solution rubber, and the filler is coated at least in part with a composition comprising an organic coating polymer of number average molecular weight of up to 3,000 which contains an acidic group (or a precursor thereof) and unsaturated groups optionally linked to the matrix polymer at least 25% w/w of which are vinyl groups.

9 Claims, No Drawings

FILLERS

This invention relates to filled cohesive polymer matrices and a process for their production.

It is known to modify the properties of a variety of organic polymers by incorporating into such polymers or mixtures thereof one or more inorganic fillers to enhance at least some of the physical properties of the polymer, for example the tensile modulus, tensile strength, or resistance to wear.

It is also known to enhance some of the interactive physical properties between a filler and the polymer matrix or precursor thereof in which it is used, and in turn to enhance the processability of the filler-precursor mixture or the properties of the filled matrix, which depend on such interactive properties. Thus, to improve the dispersibility of the filler in the matrix, or to enhance tensile strength and wear resistance of a filled polymer matrix inter alia, it is desirable to make such fillers and their matrix polymers as mutually compatible as possible and in the latter case to try to optimise filler-polymer bonding. This may be achieved by coating the filler with a material having good filler-coating bonding and to surround it with a matrix having particularly good coating-matrix bonding.

However, in some polymer systems, such physical properties may be enhanced at the expense of the appearance of the filled polymer matrix, for example the occurrence of commercially unacceptable mottling. Surprisingly we have now found that this problem can be overcome by using a specific class of filler coating polymers in such polymer systems.

Accordingly, in a first aspect the present invention provides a cohesive polymer matrix comprising a matrix polymer and a coated particulate filler dispersed therein, characterised in that the matrix polymer is a solution rubber, and the filler is coated at least in part with a composition comprising an organic coating polymer of number average molecular weight of up to 3,000 which contains an acidic group (or a precursor thereof) and unsaturated groups optionally linked to the matrix polymer at least 25% w/w of which are vinyl groups. Preferably at least 30% w/w of such groups are vinyl groups.

The polymer matrix may comprise more than one solution rubber, at least one other polymer or oligomer or an equivalent e.g. an extender, and/or more than one particulate filler provided that at least one such filler is coated as described hereinbefore.

Preferably the or each filler is inorganic and finely particulate. The coating composition may contain more than one coating polymer as hereinbefore defined.

The term "solution rubber" herein includes synthetic rubbers which have been produced by solution polymerisation, such as (without limitation) EP, EPDM, butyl, SBR and nitrile rubbers, and polychloroprene, polyisoprene, and polybutadiene when so produced.

Such solution rubbers typically contain a plurality of unsaturated e.g. olefinic groups any of which may or may not be cross-linked. If not cross-linked, this unsaturation tends to make such a polymer curable to another matrix of the present invention, for example a fluid or solid matrix may be capable of cross-linking to form another, usually solid, matrix, and this can be used to further modify the properties of a wider range of such rubbers. Precursor matrices which are convertible to other matrices of the present invention are of specific interest, since it is often such precursors which are used in the production process for the filled matrices of the present invention (described further below).

Thus, the present invention in one embodiment of its first aspect provides a precursor composition for the production of a filled cohesive solution rubber matrix which composition comprises a dispersion of a filler and a dispersion and/or solution of a coating composition as hereinbefore defined in a matrix of a precursor of that solution rubber.

Within the scope of the term "precursor of an acidic group", are included all groups convertible to free acid groups (in particular under the coating and matrix processing conditions described hereinafter), for example salts, anhydrides and imides in particular such precursors of carboxylic acid and diacid functions.

The use of the particular present coating compositions and polymers in the present solution rubber matrices confers particularly good physical properties on, or enhances particularly well the physical properties of, such coated fillers and filled matrices, whilst retaining good matrix appearance.

In the particular present matrices the matrix and their precursors polymer(s) and coating polymers have good mutual compatibility and preferably should be capable of mutual cross-linking or be mutually cross-linked e.g. via unsaturated (especially olefinic eg vinylic) groups, to enhance coating-matrix and hence filler-matrix binding. Most conventional solution rubbers or their precursors (of widely varying chemical constitution) are believed and/or appear to have particularly good compatibility with and/or ability to cross-link to the present coating polymers or compositions described further below.

If the matrix contains any matrix polymer or oligomer other than the solution rubber(s), this material should of course be compatible with the other components of the matrix, such as the solution rubber and the coating polymer, and preferably be capable of cross-linking or be cross-linked to such polymer components.

Similarly, the present coating polymers, and hence matrix polymers, appear to have not only the necessary compatibility with different filler materials, but to be versatile with a wide range of such materials including inter alia amphoteric, basic, carbonaceous and siliceous fillers.

Within the above general guidelines and those given hereinafter suitable matrix polymers and particulate fillers may be established by routine trial.

Within solution rubbers as defined hereinbefore, the or each matrix polymer may be a homopolymer or any type of copolymer (e.g. random, block or graft). It may be cross-linked or not.

Particularly useful solution rubbers include polydiene rubbers, such as sythetic butadiene-based rubbers, e.g. butadiene-styrene ('SBR') and butadiene-acrylonitrile rubbers, ('nitrile'), ethylene-propylene ('EPM') and ethylene-propylene-diene ('EPDM') rubbers, e.g. ethylene-propylene-norbordiene rubbers, and polybutadiene, and polyisoprene, which have been produced by solution polymerisation, optionally cross-linked internally and/or to the coating polymer. The foregoing polymers may of course comprise (other) comonomers. The solution rubber may often be based on a monomer in common with the coating polymer used with it, within the present matrices, e.g. a diene. Where this is the case, the coating polymer (described hereinafter)

appears to bind well to conventional emulsion rubbers of this type.

In the precursor matrices of the present invention, preferred precursor matrix polymers are diene based rubbers which still contain cross-linkable e.g. olefinic groups, preferably as part of the rubber structure, to promote matrix and matrix coating bonding. Other matrix polymers may suitably be inter alia homo- or co-polymers, -oligomers or -polycondensates based on vinylics, for example polyvinylchloride. The latter blended with a solution nitrile rubber is one suitable example of such mixed matrix polymers. Equivalents of other matrix polymers include extenders, e.g. oil extenders. EPDM with an oil extender is one suitable example of such a matrix system.

The coating polymer within the filled matrix of the first aspect of the present invention is often one with a number average molecular weight in the range 500 to 3,000 preferably in the range 750 to 1,500. These materials tend to be liquids (albeit viscous) at room temperature. However, within the scope of the present invention the coating polymers may vary widely in chemical and physical properties. Within the above ranges the dispersibility of any coating polymer as a neat liquid, a solution or particles in the matrix or its precursor under the conditions of matrix formation (described hereinafter) or filler coating (conventional) should be sufficient for it to cover the filler surface adequately and evenly to the desired extent, and the molecular weight should not be so high as to make the process matrix intractably viscous. This parameter will clearly tend to indicate to the skilled man preferred coating polymers within the foregoing favoured materials. For many types of these coating materials, preferred polymers will lie in the molecular weight range of 750 to 1,400.

(All the foregoing molecular weights include the acid/precursor groups and unsaturated groups within the coating polymer, and weight percentages of such groups hereinafter are based on the weight of the total polymer including such groups).

The coating polymer contains a plurality of unsaturated groups. The unsaturated groups are preferably olefinic. The coating polymer is capable of reacting, or has reacted, with a cross-linkable matrix polymer or its precursor, for example by free-radical or sulphidic cross-linking with a cross-linkable matrix polymer or its precursor which also contains olefinic unsaturation. The coating polymer is preferably linked to the matrix polymer by such groups. At least 25% w/w, and preferably 30% w/w, of such olefinic groups will be vinyl groups in the particular present coating polymers.

Olefinic groups may be present as part of a structure which is the product of diene polymerisation; examples of such structures include polymers and copolymers derived from one or more dienes, of which the most conveniently available is butadiene, although others may be used if desired (for example isoprene, chloroprene and 1,5-cyclooctadiene and mixtures thereof). Examples of other compounds which may be copolymerised with the diene or dienes include a wide range of vinyl monomers, for example, styrene, acrylonitrile, and mixtures thereof.

Conjugated diene polymerisation may proceed via 1,4-polymerisation to yield a linear skeleton with repeat units each with a corresponding 2-ene group, and/or via 1,2-polymerisation to yield a skeleton with pendent vinyl groups corresponding to 3-ene groups. At least 25%, and preferably 30%, w/w of any olefinic groups in such a product used in the present coating compositions will be such vinyl groups.

The probability and extent of coating-matrix bonding is of course increased in precursor matrices as hereinbefore described where the coating and matrix polymers have olefinic unsaturation, and/or by maximising the weight percentage of cross-linking eg olefinic groups in each polymer (including polymer-chain and vinylic olefinic groups) commensurate with the relative proportion of matrix to coating polymer.

A preferred concentration of any unsaturated binding groups in the coating polymer is at least one such group per 800 total polymer molecular weight, preferably at least 5% w/w of the polymer, in particular at least 10% w/w.

Suitable acidic groups within the coating polymer include carboxylic acid and diacid groups. It is preferred that the polymer does not contain acidic or basic substituents, since these tend to facilitate self-condensation of the coating polymer at the expense of the desired binding and linking. For this reason precursors of the acidic group(s) in which active hydrogen is reversibly removed are preferred over the acidic groups themselves, for example neutral salts or imides or anhydrides of the acidic group.

Suitable salt precursors include alkali metal (e.g. sodium), alkaline earth metal and in particular high alkyl quaternary ammonium salts of carboxylic acid groups.

Suitable anhydrides and imides include $\alpha$, $\beta$-dicarboxylic cyclic anhydrides and imides, as terminal or non-terminal functions, such as those derived from maleic anhydride or imide, not least because of the generally good compatibility of the relevant coating polymer with solution rubbers and their precursors.

The desirability of good filler-coating and coating-matrix bonding in e.g. enhancing tensile strength and wear resistance of the polymer matrix has been referred to above. The present coating polymer appears to bind well to conventional fillers. The general mechanism is not clear, but, without prejudice to the invention in general, in the case of a basic filler the coating polymer is believed to chemically bond to the surface of a basic filler within the matrix by reaction of the acidic group with the surface.

A preferred concentration of any acidic group or any precursor thereof in the coating polymer is at least one such group per 800 total polymer molecular weight, preferably at least 5 weight %, in particular at least 10 weight % of the polymer.

The foregoing coating polymers belong to a known class of materials.

Most of the matrix polymers mentioned hereinbefore may also be used as an additional coating composition component.

It will be appreciated from the foregoing that precursor coating polymers which contain an unreacted unsaturated group (and which are thus still capable of cross-linking and/or linking to a matrix polymer) are of specific interest, since it is often such precursors which are used in the production process for the filled matrices of the present invention (described further below).

Such precursor coating compositions may contain additives appropriate to the matrix formation reaction generally as up to 5 weight % each of the total composition e.g. an antioxidant, or a free radical initiator or a vulcanising agent and/or sulphur to promote good intra-coating, coating-matrix and/or intra-matrix linking.

Often, however, the coating composition will consist essentially of the coating polymer.

In the matrices of the present invention the proportions of matrix polymer to filler to coating polymer may vary, and may be optimised to give desired physical properties by routine trail. Where the filler is coated before incorporation into the matrix (see description of the process hereinafter) it is believed that the proportion of coating to filler in the matrix is unchanged, (i.e. by virtue of the constitution of the coated filler particles being unchanged). Where the coating polymer and uncoated filler are incorporated separately into the matrix (see process description hereinafter) it is unclear what the proportions of coating polymer are eventually present as a filler coating and as 'free' polymer in the product matrix, since the proportion of filler to free coating polymer is modified during manufacture by binding of some of the free polymer to the filler surface. By no means all of the free polymer necessarily disappears in this way; indeed, higher proportions of coating polymer are generally used in these circumstances to ensure adequate filler coating.

For these reasons the matrix composition is best described in terms of matrix polymer or precursor:filler:coating polymer proportions and these may vary widely within the scope of the present invention, inter alia with the density and specific surface area of the filler.

The proportion of the total matrix of matrix polymer may be as low as 5%, that of the filler may be 0.15 to 95%, and of the coating polymer up to 50%, all percentages being by weight. Preferably the proprotion of filler is 0.15 to 55%.

Within the above ranges the dispersibility of the filler in the matrix polymer and/or the coating polymer under the conditions of matrix formation (described hereinafter) should be sufficient for them to cover the filler surface adequately and evenly. This parameter will clearly indicate to the skilled man preferred proportions for given materials.

For a filler of relative density of about 2, and a specific surface area of about 3 $m^2gm^{-1}$, favoured proportions are 35 to 98% matrix polymer, 1.5 to 75%, preferably 1.5 to 55%, filler and 0.5 to 15% coating polymer; favoured proportions for the other particle parameters will vary in a manner evident to the skilled person.

The matrix and any precursor thereof may also contain a conventional anti-oxidant, suitably as up to 5 weight % of the matrix, and other conventional additives, for example plasticisers, pigments, antiozonants and extenders such as oil extenders.

Any particulate filler may be used in the present invention provided that the filler is stable in the matrix polymer or a precursor thereof, and under any processing conditions, in particular under any filler heating or coating, or matrix formation, conditions; it is however preferred that the filler is capable of binding to or adsorbing the coating polymer. The filler should of course desirably be insoluble in water.

Suitable fillers include amphoteric, basic, carbonaceous and siliceous fillers.

The filler may e.g. be amphoteric, e.g. such an oxide, suitable such fillers include oxides and hydroxides of aluminium, including hydrated alumina. Such fillers may be of natural or synthetic origin.

The filler, if basic, may be for example an oxide, a hydroxide, a carbonate or a basic carbonate. Suitable fillers include oxides, hydroxides, carbonate and basic carbonates of alkaline earth metals and of zinc. Preferred such fillers are the carbonates of calcium and magnesium, basic magnesium carbonates, and magnesium hydroxide. Such filler particles may be of natural or synthetic origin. For example, calcium carbonate may be in the form of ground chalk or produced in the form of a precipitated calcium carbonate, for example calcium carbonate prepared by carbonation of milk of lime.

Suitable carbonaceous fillers include carbon blacks, for example furnace blacks and thermal blacks, in particular medium thermal blacks.

Suitable siliceous materials may be natural or synthetic. Siliceous filler particles may consist of substantially pure silica, for example sands, quartzes or cristobalites or precipitated or fused silica, or may contain silica together with a proportion of one or more other metal oxides, for example acidic oxides, e.g. titania, or metal oxides capable of forming silicates, e.g. calcium, magnesium, aluminium and combinations of these. They may consist of a silicate, provided the silicate is one which is suitable for use as a filler, for example if it is insoluble in water. Suitable silicates include clays and talcs which can be produced in a sufficiently finely divided form to serve as fillers.

The filler may comprise a silicate, for example it may be a silicate coated alkaline earth metal carbonate as described in U.S. Pat. No. 4,373,178.

It is less preferred that the siliceous particles consist predominantly of silica and especially less preferred that they consist of substantially pure silica itself.

Mixtures of all the foregoing particulate fillers may be used.

The filler particles for use in the invention may have any form suitable for a filler, and may have a wide variety of particle shapes and sizes. For example, they may be of irregular, fibrillar or laminar form. Most conveniently the particulate filler is a free-flowing finely-divided powder, as usually commerically available.

Most commonly the filler particles will have a size in the range 10 Angstrom to 1 mm, though we prefer, on account of the good reinforcing effect and high filler loading that is possible, that the particle size is in the range 0.01 to 100 micron, e.g. 0.05 to 20 micron. Typically the particles will have a specific surface area of 0.1 to 250 $m^2g^{-1}$, preferably 1.5 to 75 $m^2g^{-1}$, in particular 2 to 25 $m^2g^{-1}$.

For high filler loadings the particles may be a mixture of two sets of particles with two widely differing mean sizes such that one set of particles can fit in the interstices of the other within the matrix.

In a second aspect the present invention provides a process for the production of a filled cohesive solution rubber matrix, which process comprises intimately mixing a matrix solution rubber or a precursor thereof with (a) a filler and a coating composition or precursor thereof as hereinbefore defined, or (b) a filler coated with a coating composition or precursor thereof, and thereafter as necessary converting any solution rubber precursor in the mixture to a solution rubber matrix.

Variant (a) is preferred.

A mixture of matrix polymers and/or precursors may of course be used. Precursors of the matrix polymers and/or compositions are preferred.

Where any linking reactions are in the second process (conversion) step and involve any matrix polymer, they are part of a conventional matrix curing process. This may be effected conventionally, e.g. by heating to set a thermosetting polymer or its precursor, or by heating, processing and cooling for a thermoplastic. Radiation curing may also be used.

The mixing step in either process variant may be carried out by conventionally blending the matrix polymer or precursor with the coated filler or with the coating polymer or precursor and the filler, for example by milling e.g. using a ball-mill or multi-roll mill or high-shear mixing or mixing in a planetary vacuum mixer.

It may be helpful to apply some heat, in either process step. Suitable reaction temperatures may vary over a wide range below that which is deleterious to any component, but will typically be in the range of 15° to 200° C., for example ambient. The application of heat may be desirable both for ease of application of fluid coating and/or matrix precursor compositions (the viscosity of which generally decreases usefully with rising temperatures) and, as may be desired, to promote any linking reactions.

Process times are typically in the range 1 minute to 6 hours. Ambient pressure is suitable.

The coating polymer or its precursor is often conveniently liquid (even if a viscous liquid) at ambient temperatures or in the form of a free flowing powder with a melting point range within the range of 20 to 230, more conveniently 20° to 130° C. The convenience of such properties in the present processes will be readily appreciated.

The process may be carried out in the presence of protecting agents, e.g. antioxidants, and/or in an inert atmosphere, e.g. nitrogen, argon or solvent vapour, if it is desired to guard against deterioration of the polymer during any heating that may be necessary, and with conventional additives (e.g. processing aids), such as mentioned hereinbefore as optional components of the coating composition precursor or the matrix precursor, e.g. for linking reactions, which may be incorporated in either or both, before or during the preparative process.

In preferred process variant (a), not all of the coating polymer of the present invention may coat the filler, but coating in this process variant appears not to be hampered. However, it may be desirable to use an excess of coating polymer/composition over that theoretically needed to coat the filler alone to the desired extent.

The coated fillers for use in variant (b) belong to a known class of such fillers and may be prepared by known methods. Preferably they are coated with a proportion of coating polymer/composition or precursor thereof which produces a matrix composition within the ranges mentioned hereinbefore.

Each filler particle will often be on average at least 95% coated, favourably fully coated. However, partially coated particles may be acceptable, for example at least 40%, favourably at least 75%, coated.

In both process variants of course the process components are generally a continuous or particulate fluid, and there must also be sufficient of one or more matrix polymers or precursors to flow and mix with, and fully enclose the filler particles and ensure good dispersion of the filler through the product matrix. Suitable proportions within the ranges given hereinbefore can be determined by simple trial and are not necessarily critical. In either process variant, there may also be used a vehicle (solvent or dispersant) for the matrix polymer and/or the coating composition to assist the spread of the matrix polymer and/or coating over the filler (especially when the coating represents a low proportion of the matrix and/or the coated filler).

Any such vehicle may be chemically inert and should be of low flammability and low toxicity, and, where the desired product matrix is a solid, a low boiling point will tend to be significant in the subsequent necessary removal of the vehicle from the mixture.

It may in some cases be convenient to use a vehicle which contains unsaturation, e.g. olefinic or acrylic unsaturation, in particular where a precursor coating or matrix polymer contains unreacted unsaturation of the same type. Such a vehicle will of course in general be capable of taking part in any concomitant or subsequent linking reactions, e.g. with a coating and/or matrix polymer precursor, advantageously to promote matrix-filler linking.

The desired polymer matrix may be a fluid, such as a sealant or high-build surface coating, in which the matrix polymer is a solution, or emulsion or other dispersion in a vehicle. In such a case the processing vehicle may be retained as the vehicle for the final product.

Suitable conventional vehicles and their proportions in the process (and optionally in the desired product) will be well-known to the skilled man, or can be readily determined by simple trail.

Matrix cross-linking, matrix-coating linking, coating cross-linking, and or coating-filler linking reactions may be incorporated in either or both steps. Cross-linking or linking reactions may involve the matrix polymer(s) or precursor(s), the coating polymer of the invention, and any other polymer in the coating.

Linking of the types above may take place separately or concurrently when any of the foregoing polymers/precursors are of the following preferred types:

Preferably the coating composition comprises a coating polymer in which all the unsaturation is olefinic, in particular a polydiene based polymer. Preferably also the or at least one solution rubber precursor is a compound which may be linked internally or with the coating polymer, in particular with a polydiene based coating polymer, but otherwise may be of widely varying chemical constitution. Examples of such precursors for use in the process of the present invention include the non-cross-linked polymers corresponding to any cross-linked polymers in the product matrix.

The filler and the coating polymer are preferably capable of good mutual bonding. A basic filler and coating polymer which comprises at least one terminal or non-terminal cyclic anhydride or imide group (in particular a carboxylic such group) as an acidic group precursor are amongst preferred filler coating combinations.

Where a basic filler is coated by a coating composition comprising a polymer containing an acidic group precursor group, it is desirable to convert that precursor group to the acidic group, so that the filler is coated at least in part with coating polymer which is bound to the filler surface. This is conveniently effected in situ in the matrix formation/coating process by incorporating a converting reagent in the process. Thus, for example, where the precursor is an anhydride, a suitable reagent is water, either as reactable water within the filler itself or within any vehicle used.

We have found that the coating composition or precursor used in the present invention acts as a good dispersant for filler particles in matrices of solution rubbers or their precursors, and accordingly in a third aspect the invention provides the use of such coating compositions as dispersants for fillers in such matrices.

The preparation of filled polymer matrices of the present invention is illustrated by the following Examples. The preparation of coating polymer materials is illustrated by the following Description, wherein all parts and percentages are by weight.

DESCRIPTION

Preparation of Organic Coating Polymer MPBD's (Maleinised Polybutadienes)

Maleinised polybutadiene was prepared by the reaction of polybutadiene (100 parts) with maleic anhydride at 180°–190° C. for six hours under a nitrogen atmosphere., with an antioxidant.

Each polybutadiene consists of 40–50% vinyl- 1,2; 30–40% trans- 1,4; and 15–25% cis- 1,4 unsaturation.

The following were so prepared
MPBD(1)=butadiene $M_n$=1300, anhydride 10%
MPBD(2)=butadiene $M_n$=1300, anhydride 20%
MPBD(3)=butadiene $M_n$=1300, anhydride 40%
MPBD(4)=butadiene $M_n$=900, anhydride 20%

Some of the above products were subsequently conventionally hydrolysed to give the corresponding free acid form of the MPBD. The composition of these, based on anhydride was:
MPBD(5)=butadiene $M_n$=900, anhydride 20%
MPBD(6)=butadiene $M_n$=1300, anhydride 20%

EXAMPLE

Polymer matrices of the following compositions were compounded on a twin roll mill as in process variant (a) described hereinbefore. (i.e. with direct compounding of inter alia matrix emulsion rubber, uncoated filler and a dispersion of a coating composition in the mixture). The matrices were then press cured at 160° C. (sulphur cures) or 180° C. (peroxide cures), cure times being determined by a Monsanto rheometer.

COMPOSITION 1

|  | Parts by weight |
| --- | --- |
| Matrix Polymer: EPDM, Vistalon 3666 (Esso) (including an oil extender) | 200 |
| Filler: Talc (Mistron Vapour RP6D) | 171 |
| Coating Composition: MPBD (2) | 5.1 |
| Other: | |
| ZnO | 5.7 |
| Stearic Acid | 2.3 |
| Vulcafor TMTM (Vulnax Internat Ltd) | 1.8 |
| Vulcafor MBT (Vulnax Internat Ltd) | 1.8 |
| Vulcafor TMTD (Vulnax Internat Ltd) | 0.9 |
| Sulphur | 1.8 |
| Cure time: 16.2 min | |

COMPOSITION 2

As for composition 1, but using clay (Supreme, English China Clays) in place of talc. Cure time 16.9 min.

COMPOSITION 3

As for composition 1, but using: Precipated CaCO3, Calofort U (J E Sturge) in place of talc, and MPBD(1) 3.4 parts in place of MPBD(2) 5.1 parts. Cure time: 11.8 min.

COMPOSITIONS 4, 5 and 6

As for composition 3, but using respectively MPBD(2), MPBD(3) and MPBD(4) in place of MPBD(1). Cure times respectively 12.6, 13.5 and 12.0 min.

COMPOSITION 7

|  | Parts by weight |
| --- | --- |
| Matrix Polymer: EPDM, Vistalon 3666 | 175 |
| Filler: Precipitated CaCO3, Calofort U | 150 |
| Coating Composition: MPBD(5) | 3 |
| Other: | |
| ZnO | 5 |
| Stearic Acid | 2 |
| Vulcafor TMTM | 1.6 |
| Vulcafor MBT | 1.6 |
| Vulcafor TMTD | 1.6 |
| Sulphur | 1.6 |
| Cure time: 10.7 min | |

COMPOSITION 8

As for composition 7, but using MPBD(6) in place of MPBD(5). Cure time 12.3 min.

COMPOSITION 9

|  | Parts by weight |
| --- | --- |
| Matrix Polymer: EPDM, Vistalon 3666 | 350 |
| Filler: Precipitated CaCO3, Calofort U | 300 |
| Coating Composition: MPBD(1) | 6 |
| Other | |
| ZnO | 10 |
| ATM3 (Ancomer Ltd) | 4 |
| Permanax WSP (Vulnax) | 2 |
| Perkadox 14-40B (AK20) | 12 |
| (Peroxide cure). Cure time 11.0 min | |

COMPOSITIONS 10, 11 and 12

As for composition 9, but using respectively MPBD(2), MPBD(3) and MPBD(4). Cure times respectively 11.4, 12.5 and 12.6 min.

Medium thermal carbon black may be used in any of the foregoing compositions in place of the filler therein.

EXAMPLE 2

All the final, filled and vulcanised matrices were found to have good appearance and were tested in accordance with the following procedures.

Tensile stress-strain properties were measured in an Instron 1122 Tensile Testing Machine according to BS903 part A2 using dumbels cut from 2 mm thick sheet. Tear strength properties were measured according to DS 903 part A3 using method c-crescent shaped test pieces cut from 2 mm thick sheet and nicked using a Wallace Tear Test Specimen Nicking Cutter.

Hardness was measured on 4 mm thick sheet accordingly to BS 903 part A 26 using a Wallace Dead Load Hardness Tester for Rubber.

Rebound resilience was measured on 4 mm thick sheet according to BS 903 part A8 using a Dunlop Tripsometer with a drop angle 45°.

Compression set was measured according to BS 903 part A6 using a Wallace compression set apparatus. The results were calculated from plugs subjected to a 25% compressive strain for 24 hours at 70° C.

Volume swell was measured on 2 mm thick sheet according to BS 903 part A16 using a volumetric method. The results were calculated on samples subjected to distilled water at 95° C. for 72 hours.

These properties are shown in the following Table.

TABLE

| | | | FILLER PERFORMANCE IN MATRICES OF EXAMPLE 1 | | | | |
|---|---|---|---|---|---|---|---|
| COMPOSITION | 300% MODULUS MPa | TENSILE MODULUS MPa | % ELONGATION TO BREAK | TEAR STRENGTH $Nmm^{-1}$ CRESCENT | REBOUND RESILIENCE | VOLUME SWELL % | HARDNESS (IRHD) |
| 1 | 4.0 | 7.4 | 727 | 28.6 | 56 | | 54 |
| 2 | 5.5 | 10.3 | 718 | 37.7 | 51 | 1.3 | 55 |
| 3 | 3.5 | 11.0 | 692 | 27.7 | 54 | −0.1 | 55 |
| 4 | 3.7 | 11.2 | 670 | 25.3 | 56 | −0.2 | 57 |
| 5 | 3.4 | 10.9 | 655 | 21.7 | 59 | −0.3 | 57 |
| 6 | 3.7 | 12.4 | 691 | 35.8 | 57 | −0.3 | 55 |
| 7 | 3.7 | 10.9 | 636 | 26.2 | 60 | −0.2 | 58 |
| 8 | 4.0 | 12.3 | 687 | 47.0 | 58 | −0.6 | 59 |
| 9 | 3.8 | 10.0 | 638 | 29.2 | 54 | 0.3 | 52 |
| 10 | 4.4 | 10.2 | 601 | 28.4 | 54 | 0.2 | 52 |
| 11 | 4.5 | 9.7 | 593 | 30.7 | 55 | 0.5 | 52 |
| 12 | 4.3 | 10.2 | 624 | 28.6 | 55 | 0.0 | 51 |

We claim:

1. A cohesive polymer matrix comprising:
a matrix polymer and a coated particulate filler dispersed therein, characterized in that the matrix polymer is a solution rubber, and the filler is coated, at least in part, with a composition comprising:
an organic coating polymer of number average molecular weight in the range 750 to 1,400 which contains an acidic group (or its salt, imide, or anhydride) and unsaturated groups either bonded or non-bonded to the matrix polymer at least 30% w/w of which are vinyl groups.

2. A matrix according to claim 1, characterised in that the matrix polymer is a solution EPDM rubber.

3. A matrix according to claim 1, characterized in that it, as a precursor matrix, can cross-link to another said matrix and comprises a dispersion of a filler and a dispersion or solution of a coating composition, as defined in claim 1, in a matrix of a non-cross-linked solution rubber.

4. A matrix according to claim 3, characterized in that it can cross-link to form another said matrix by reaction of a crosslinking functional group in the coating polymer or the matrix polymer with a functional group on the matrix polymer or an additional matrix polymer.

5. A matrix polymer according to claim 4, characterised in that the cross-linking function is an olefinic group.

6. A matrix according to claim 1, characterised in that the coating polymer comprises at least 5 weight % of unsaturated groups.

7. A matrix according to claim 1, characterised in that the coating polymer is a substituted polybutadiene or polyisoprene.

8. A matrix according to claim 1, characterised in that the coating polymer comprises an α,β-dicarboxylic cyclic anhydride group or the product of the reaction of the same with the filler surface.

9. A process for the production of a filled cohesive solution rubber matrix according to claim 1, said process comprises intimately mixing a matrix solution rubber with:
a filler and a coating composition as defined in claim 1 or
a filler coated with a coating composition
and thereafter as necessary chemically converting unreacted solution rubber to form the solution rubber matrix.

* * * * *